United States Patent Office 3,577,559
Patented May 4, 1971

3,577,559
PROCESS FOR MAKING GLYCOL ETHERS AND GLYCOL ESTERS
Lee H. Horsley, Midland, Mich., assignor to The Dow Chemical Company, Midland, Mich.
No Drawing. Filed Jan. 19, 1968, Ser. No. 699,055
Int. Cl. C07c 69/76
U.S. Cl. 260—410.6
11 Claims

ABSTRACT OF THE DISCLOSURE

Glycol ethers or glycol esters having the formula $ROC_mH_{2m}ZC_nH_{2n}OH$ are prepared by reacting a compound having the formula ROH, a cyclic compound having the formula $C_mH_{2m}Z$ and having at least three and not more than five carbon atoms in the ring and a vicinal alkylene oxide having the formula $C_nH_{2n}O$ where the molar ratio of $C_mH_{2m}Z$ to vicinal oxide is between one to ten and ten to one, the molar ratio of vicinal oxide plus $C_mH_{2m}Z$ to ROH is at least one to one, R is acyl having at least two and not more than eighteen carbon atoms or aryl having up to two aromatic rings, Z is oxygen or sulfur, m is an integer of from three to fifteen inclusive and n is an integer of from two to four inclusive. They are useful as solvents, lubricants, hydraulic fluids and chemical intermediates.

BACKGROUND OF THE INVENTION

There is no known prior art concerning the reaction of a carboxylic or phenolic group, a vicinal alkene oxide and a polymethylene cyclic ether (e.g. tetrahydrofuran) to give a glycol ester or glycol ether containing the polymethylene cyclic ether moiety.

SUMMARY OF THE INVENTION

It has now been found that glycol ethers or glycol esters having the formula $ROC_mH_{2m}ZC_nH_{2n}OH$ are produced in good yields by reacting a compound having the formula ROH, a cyclic compound having the formula $C_mH_{2m}Z$ and having at least three and not more than five carbon atoms in the ring and a vicinal alkylene oxide having the formula $C_nH_{2n}O$ where the molar ratio of $C_mH_{2m}Z$ to vicinal oxide is between one to ten and ten to one and the molar ratio of vicinal oxide plus $C_mH_{2m}Z$ to ROH is at least one to one. In each of the above formulas, R is acyl having at least two and not more than eighteen carbon atoms (preferably having not more than eight carbon atoms) or aryl having up to two aromatic rings, Z is oxygen or sulfur, m is an integer of from three to fifteen inclusive and n is an integer of from two to four inclusive.

In order to practice the invention, a compound having the formula ROH, a cyclic compound having the formula $C_mH_{2m}Z$ and having at least three and not more than five carbon atoms in the ring and a vicinal alkylene oxide having the formula $C_nH_{2n}O$ are reacted in any convenient manner, to produce a glycol ether or glycol ester having the formula $ROC_mH_{2m}ZC_nH_{2n}OH$ wherein the molar ratio of $C_mH_{2m}Z$ to vicinal oxide is between one to ten and ten to one and the molar ratio of vicinal oxide plus $C_mH_{2m}Z$ to ROH is at least one to one. The desired product is then removed from the product mixture by conventional methods. The products are useful as solvents, lubricants, hydraulic fluids and chemical intermediates.

The term acyl is meant to include radicals of aliphatic fatty acids such as acetic, butyric, lauric, palmitic, stearic, acrylic, methacrylic, oleic, propiolic and the like. The term acyl is also meant to include radicals of aromatic acids such as benzoic, toluic, phenylacetic, naphthoic, phthalic and the radicals of halo, alkoxy and aryloxy-substituted acyl groups. Examples of this latter class include lactic, diglycolic, phenoxyacetic, chlorobenzoic, bromobenzoic and anisic acid.

The term aryl is meant to include the aromatic monocyclic and dicyclic radicals, i.e., of the phenol and naphthol series. Of course, these radicals may also contain inert substituents such as alkyl, aryl, halo, alkoxy and aryloxy. Examples of these substituted aromatics are o-chlorophenol, iodonaphthol, methoxynaphthol, m-cresol and phenoxynaphthol.

Examples of vicinal oxides useful to this invention are ethylene oxide, propylene oxide, 1-butene oxide and 2-butene oxide. The cyclic compound having the formula $C_mH_{2m}Z$ must have at least three and not more than five carbon atoms in the ring. Examples of cyclic compounds useful in this invention are trimethylene oxide, tetrahydrofuran, pentamethylene oxide, tetrahydrothiophene and pentamethylene sulfide. Alkyl substituted cyclics such as the 2-alkyl; 3-alkyl; 2,3-dialkyl; and similar alkyl substituted cyclics are also suitable for use in this invention. Specific examples of these compounds are 2-butyl tetrahydrofuran, 2,5-ethyl pentamethylene oxide and 2-ethyl pentamethylene sulfide.

The molar ratio of vicinal oxide plus $C_mH_{2m}Z$ to ROH should be at least one to one and preferably at least three to one. Of course, higher molar ratios may be employed without substantial effect on the invention.

The usual oxyalkylation catalysts may be used in this process, but higher yields of the desired products are obtained without using a catalyst. Thus, the preferred method of operation is to conduct the reaction in the absence of a catalyst.

The temperature range employed is between 80 and 200° C. and preferably between 100 and 150° C. Lower temperatures give low reaction rates. Although autogenous pressure is preferred, higher pressures can suitably be used.

DESCRIPTION OF SPECIFIC EMBODIMENTS

Below are specific examples of the practice of our invention.

Example 1

A mixture of 0.01 mole of acetic acid, 0.02 mole of ethylene oxide and 0.04 mole of tetrahydrofuran (THF) was sealed in a glass tube and heated at 140° C. for 4 hours. The tube was cooled and opened. Analysis of the sample by titration showed 63 mole percent conversion of the acetic acid. The product after removal of the unreacted acid and the excess ethylene oxide and THF consisted of 2.14 parts of ethylene glycol monoacetate, 0.43 part of diethylene glycol monoacetate and 15 parts of the desired $CH_3COO(CH_2)_4OC_2H_4OH$. This corresponds to 85% yield of the desired product.

Using a similar procedure, the following results were obtained and are reported in Table I following.

TABLE I

[Reaction of acids plus alkene oxides plus cyclic compound]

| Run No. | Acid | | Oxide | | Cyclic compound | | °C. | Hrs. | Percent conv.[b] | Yield of desired product[c] |
|---|---|---|---|---|---|---|---|---|---|---|
| | Type | Moles | Type[a] | Moles | Type[a] | Moles | | | | |
| 1 | HOAc | .01 | E.O. | .01 | THF | .063 | 140 | 1 | 10.5 | 90.5 |
| 2 | HOAc | .01 | E.O. | .01 | THF | .063 | 140 | 4.25 | 32 | 87.2 |
| 3 | HOAc | .01 | E.O. | .02 | THF | .057 | 140 | 1 | 16 | 95.1 |
| 4 | HOAc | .01 | E.O. | .02 | THF | .057 | 140 | 4.25 | 51 | 85.4 |
| 5 | HOAc | .01 | E.O. | .04 | THF | .045 | 140 | 1 | 32 | 86.9 |
| 6 | HOAc | .01 | E.O. | .04 | THF | .045 | 140 | 4.25 | 71 | 79.1 |
| 7 | HOAc | .01 | E.O. | .02 | THF | .02 | 140 | 4 | 85 | 71.8 |
| 8 | HOAc | .01 | E.O. | .01 | THF | .03 | 100 | 23 | 51.44 | 82.5 |
| 9 | HOAc | .01 | i-BO | .03 | THF | .03 | 100 | 20 | 35 | 15.6 |
| 10 | HOAc | .01 | i-BO | .03 | THF | .03 | 100 | 20 | 31 | 54.0 |
| 11 | HOAc | .01 | i-BO | .03 | THF | .03 | 100 | 20 | 57 | 28.0 |
| 12 | HOAc | .01 | V E.O | .03 | THF | .03 | 100 | 20 | 57 | 53.1 |
| 13 | HOAc | .01 | E.O. | .03 | TMO | .03 | 100 | 17.5 | 83 | 84.1 |
| 14 | HOAc | .01 | E.O. | .03 | PMO | .03 | 100 | 17.5 | 52 | 40.6 |
| 15 | HOAc | .01 | E.O. | .03 | THT | .03 | 100 | 17.5 | 100 | 38.0 |
| 16 | HOPr | .01 | E.O. | .03 | THF | .03 | 140 | 4 | 99 | 44.4 |
| 17 | HOBz | .01 | E.O. | .03 | THF | .03 | 140 | 4 | 99.7 | 74.7 |
| 18 | Methacrylic | .01 | E.O. | .03 | THF | .03 | 140 | 3 | 93 | 50.0 |
| 19 | do | .01 | P.O. | .03 | THF | .03 | 140 | 3 | 67 | 51.6 |
| 20 | do | .01 | P.O. | .03 | TMO | .03 | 140 | 3 | 90 | 76.4 |

[a] THF=Tetrahydrofuan; HOAc=Acetic acid; E.O.=Ethylene oxide; i-BO=Isobutene oxide; V E.O.= Vinyl ethylene oxide; TMO=Trimethylene oxide; PMO=Pentamethylene oxide; THT=Tetrahydrothiophene; HOPr=Propionic acid; HOBz=Benzoic acid.
[b] Percent conversion of acid starting material.
[c] Percent $ROC_mH_{2m}ZC_nH_{2n}OH$ produced based on acid converted.

EXAMPLE 2

A mixture of 0.01 mole of 2,4-dichlorophenol, 0.03 mole of ethylene oxide and 0.03 mole of tetrahydrofuran was sealed in a glass tube and heated for 4 hours at 140° C. The tube was cooled and opened for analysis. Titration of a sample showed 51% conversion of the 2,4-dichlorophenol. After removal of the unconverted phenol and excess ethylene oxide and tetrahydrofuran there remained a mixture of 30.6 parts of ethylene glycol mono-2,4-dichlorophenyl ether, 6.1 parts of diethylene glycol mono-dichlorophenyl ether and 63.3 parts of the desired $Cl_2C_6H_3$—$O(CH_2)_4C_2H_4OH$.

Using a similar procedure, the following results were obtained and are reported in Table II below. In each run, 0.01 mole of the phenol, 0.03 mole of ethylene oxide and 0.03 mole of tetrahydrofuran were the reactants.

TABLE II

[Reaction of phenols + alkene oxide + cyclic compound]

| | Reactant, phenol | | °C. | Hrs. | Yield of desired product[b] |
|---|---|---|---|---|---|
| | Type[a] | Moles | | | |
| Run No.: | | | | | |
| 16 | Phenol | .01 | 100 | 17.5 | 42.8 |
| 17 | t-Bu | .01 | 100 | 17.5 | 36.8 |
| 18 | m-Chloro | .01 | 100 | 17.5 | 78.5 |
| 19 | p-Chloro | .01 | 100 | 17.5 | 77.8 |
| 20 | 2,4-D | .01 | 100 | 17.5 | 74.5 |
| 21 | 2,4-D | .01 | 140 | 4 | 63.3 |
| 22 | Penta | .01 | 100 | 17.5 | 35.7 |

[a] t-Bu=p-tert-Butylphenol; m-Chloro=m-Chlorophenol; p-Chloro=p-Chlorophenol; 2,4-D=2,4-dichlorophenol; Penta=Pentachlorophenol.
[b] Percent $ROC_mH_mZC_nH_{2n}OH$ produced based on phenol converted.

I claim:

1. A process for making glycol ethers or glycol esters having the formula $ROC_mH_{2m}ZC_nH_{2n}OH$ comprising reacting a compound having the formula ROH, a cyclic compound having the formula $C_mH_{2m}Z$ and having at least three and not more than five carbon atoms in the ring and a vicinal alkylene oxide having the formula $C_nH_{2n}O$ where the molar ratio of $C_mH_{2m}Z$ to vicinal oxide is between one to ten and ten to one, the molar ratio of vicinal oxide plus $C_mH_{2m}Z$ to ROH is at least one to one, R is acyl derived from a carboxylic acid having at least two and not more than eighteen carbon atoms or aryl having up to two aromatic rings, Z is oxygen or sulfur, $m$ is an integer of from three to fifteen inclusive and $n$ is an integer of from two to four inclusive.

2. A process as defined in claim 1 wherein the molar ratio of vicinal oxide plus $C_mH_{2m}Z$ to ROH is at least three to one.

3. A process as defined in claim 1 wherein the temperature is between 80 and 200° C.

4. A process as defined in claim 1 wherein the temperature is between 100 and 150° C.

5. A process as defined in claim 1 wherein no catalyst is used.

6. A process as defined in claim 1 wherein R is a fatty acid radical or a phenol radical.

7. A process as defined in claim 1 wherein R is an aromatic acid radical or a naphthol radical.

8. A process as defined in claim 1 wherein R is a halo, alkoxy, aryloxy, alkyl or aryl-substituted acyl or aryl group.

9. A process as defined in claim 1 wherein the vicinal oxide is ethylene, propylene, 1-butene or cis-2-butene oxide.

10. A process as defined in claim 1 wherein the cyclic compound having the formula $C_mH_{2m}Z$ is trimethylene oxide, tetrahydrofuran or pentamethylene oxide.

11. A process as defined in claim 1 wherein the compound having the formula ROH is acrylic or methacrylic acid.

References Cited

UNITED STATES PATENTS

| 2,314,454 | 3/1943 | Manchen et al. | 260—496 |
| 2,819,296 | 1/1958 | Carnes et al. | 260—486 |
| 3,206,486 | 9/1965 | Nankee | 260—410.6 |

LORRAINE A. WEINBERGER, Primary Examiner

R. S. WEISSBERG, Assistant Examiner

U.S. Cl. X.R.

260—469, 473, 475, 476, 484, 486, 488, 496, 609, 613